Jan. 3, 1956 G. WHITE 2,729,032
GLASS BENDING APPARATUS
Filed Dec. 9, 1952

Inventor
Gerald White
Nobbe & Swope
Attorneys

United States Patent Office 2,729,032
Patented Jan. 3, 1956

2,729,032

GLASS BENDING APPARATUS

Gerald White, Rossford, Ohio, assignor to Libbey-Owens-Ford Glass Company, Toledo, Ohio, a corporation of Ohio Application December 9, 1952, Serial No. 324,875

7 Claims. (Cl. 49—67)

This invention relates broadly to apparatus for bending glass sheets or plates.

More particularly, it relates to improved means for locating the end edges of flat glass sheets, either singly or in matched pairs, above a mold shaping surface of desired curvature and for guiding said edges during the bending of said sheets into conformity with said shaping surface.

It has generally been the practice in bending glass sheets, either singly or in matched pairs, to support the sheets when flat above a mold shaping surface of the desired curvature and to cause them to bend into conformity with said shaping surface under the influence of heat and gravity. In order to maintain a major portion of the glass sheets out of contact with the shaping surface during the actual bending operation, it has been customary to support them at only their marginal edges.

Locating means have been provided adjacent the supports for properly positioning the glass sheets relative to the shaping surface of the mold. It has heretofore been proposed to form these locators of a material which will not fuse with the adjacent marginal portions of the glass sheets when said sheets are subjected to bending temperatures. In the case of rather severe bends, it has been further proposed to coordinate the movements of the locators to that of the glass sheets being bent to cause said locating means to exert longitudinal pressure on the adjacent marginal edges of the glass sheets in guiding them into bent conformity with the mold shaping surface.

It is an object of this invention to provide improved locating and guiding means of the type described which will resiliently bear against the edges of the glass sheets in guiding them into conformity with the mold shaping surface.

Another object of this invention is to provide locating and guiding means of the type described which will act to disperse the bending temperature heat along the edges of the glass sheet located thereby.

Still another object of this invention is to provide locating and guiding means of the type described having a smooth surface against which the edge of the glass sheet may slide during bending thereof.

Still another object of this invention is to provide locating and guiding means of the type described having increased resistance to wear by said sheet edge.

Other objects and advantages of the invention will become more apparent during the course of the following description when taken in connection with the accompanying drawings.

In the accompanying drawings, wherein like numerals are employed to designate like parts throughout the same:

According to this invention, the locating and guiding means comprises a substantially rectangular hard core, an inner layer of glass cloth over said core, a layer of stainless steel mesh over said inner layer of glass cloth and an outer layer of sheet metal over said layer of stainless steel mesh. The several layers are arranged over said core and the composite structure is associated with the bending apparatus in such a manner that the edge of the glass sheet extends transversely thereof as it is located and guided thereby.

It has been found that the marginal edges of glass sheets are frequently twisted in the plane of the sheet as said sheet is bent from a flat to an irregular bent curvature and thus caused to slide over the surface of the locating and guiding means. As well, irregularities are often encountered in the pattern cutting of said edges such that they will not bear evenly on a flat surface of said locating and guiding means. In the case of bending matched pairs of glass sheets, it will be readily understood that one of said sheets will, during the bending operation, be projected outwardly against said locating and guiding means farther than the other.

I have found that by providing the locating means of this invention with a resilient bearing surface of glass cloth or the like over a hard core, the marginal edges of the single or matched glass sheets will be positively and securely located and guided in the manner described. At the same time, this novel locating means will adapt itself to the minor surface irregularities and movements of said marginal edges during the bending operation. Thus, said edges will not be chipped nor the glass sheet itself distorted during said bending operation.

Glass cloth has been found to provide an excellent resilient support for the edges as it will not fuse with said edges at the bending temperature of the glass sheets. However, I have further found that the heat used in bending the sheets is better dispersed from and transmitted to the edges thereof if the actual contacting surface of the locating means is of a heat-conducting material. That is, glass cloth is an insulator and if actually used as the edge-contacting surface of the locating means will promote irregular bending at the area of said edge. Thus, for the purpose of better heat dispersion, outer layers of stainless steel mesh and sheet metal are placed over the glass cloth layer.

This outer layer has also been found to greatly increase the life of the locating means by providing a more wear resistant surface than the relatively soft glass cloth for contacting the edges of the glass sheets. This has been found especially true when said edges are caused to slide over the surface of said locating and guiding means. At the same time, thin pliable layers of sheet metal do not detract from the resilient nature of the locating means.

Figure 1:
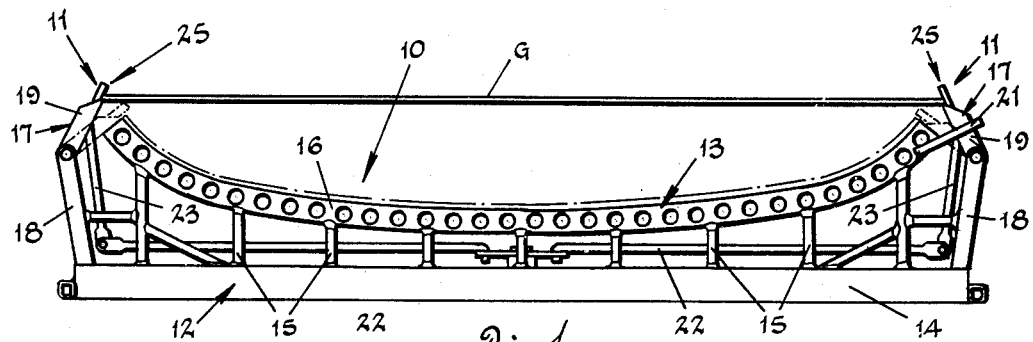
Fig. 1 is a side view of a conventional glass sheet bending mold having associated therewith an improved locating and guiding means constructed in accordance with this invention.
Figure 2:
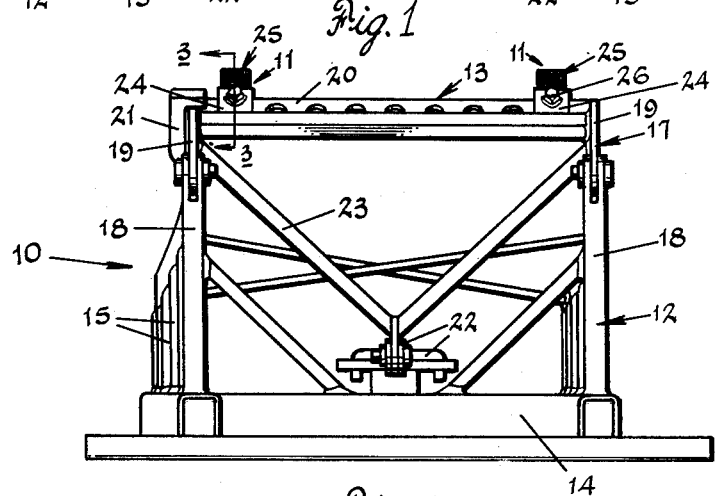
Fig. 2 is an end view of the bending mold and locating and guiding means of Fig. 1.
Figure 5:
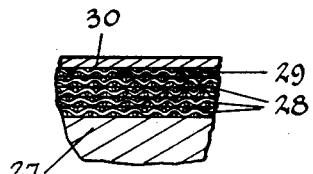
Fig. 5 is a further enlarged detail view of the locating and guiding means shown in Fig. 4.

Referring now particularly to the drawings, there is shown in Figs. 1 and 2, a conventional type of bending apparatus, designated in its entirety by the numeral 10, and locating and guiding means 11, constructed in accordance with this invention and associated with said bending apparatus. This beanding apparatus 10 is more particularly shown and described in Patent No. 2,554,572 dated May 29, 1951 and forms no part of this invention. In fact, said apparatus is shown herein only for purposes of illustration and is not intended to limit the concept of this invention. It is contemplated that the novel locating means of this invention may be employed with any bending apparatus of the type heretofore described in which a glass sheet is supported when flat above a mold shaping surface and caused to bend under the influence of heat and gravity and into conformity with said shaping surface.

The bending apparatus 10 includes a frame 12 and a bending mold 13. The frame comprises a base portion 14 and upstanding posts 15 upon which the mold is supported. The mold 13 is of the open ring or outline type and has formed on the upper edge thereof a continuous shaping surface 16 which conforms to the curvature of and in outline to the glass sheet G (Fig. 1) or, if desired, matched sheets G' (Fig. 3), when finally bent.

Disposed at each end of the mold 13 are sheet edge supporting means 17 which are carried in operative relation to the shaping surface 16 of the mold from suitably braced uprights 18 disposed at opposite corners of frame 12. Each of the supporting means 17 comprises arms 19 pivotally supported from the upper ends of uprights 18 and carrying therebetween a supporting bar 20 which is movable into and out of abutting relation with an end portion of the mold 13. As shown by the phantom lines of Fig. 1 and more particularly in Fig. 3, as the bar 20 moves into said abutting relation, the top edge thereof is disposed slightly below the shaping surface 16 of the adjacent portion of the mold.

As more fully described in the aforementioned patent, the flat glass sheet or sheets to be bent are supported at their margins on the bars 20 and are located in proper relation to shaping surface 16 of mold 13 by means of the sheet edge locating and guiding means 11 secured to the outer side of bars 20 and upstanding therefrom. That is, arms 18 are swung upwardly and outwardly on their pivotal connections with uprights 17 such that bars 20 are disposed out of abutting relation with mold 13 an amount sufficient to receive the flat glass sheets therebetween. In this connection, the outward movement of said arms may be limited by a hook-shaped bracket 21 secured to the side of the mold 13 so that the bars may not reach a position at which they would tend to fall away from said mold. The flat sheets act as a strut and are maintained in proper relation to the mold in resting at their margins on bars 20 and bearing at their edges against the locating and guiding means 11 to hold the mold in the glass-receiving position.

Figure 3:
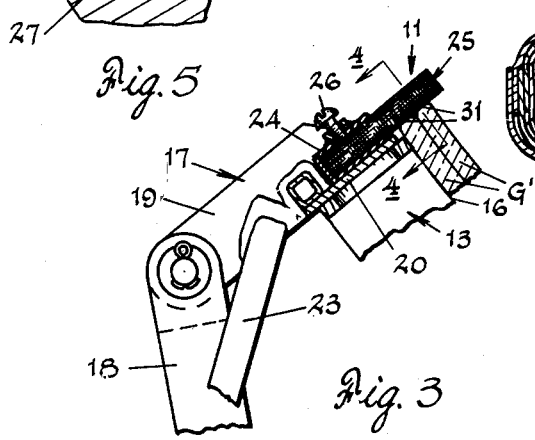
Fig. 3 is an enlarged detail sectional view of the locating and guiding means and support therefor, taken substantially along line 3—3 of Fig. 2.

As the sheets are softened under the bending temperatures of the glass, they lose their strut-like character and bend into conformity with the mold shaping surface 16. During the actual bending thereof, bars 20 will follow the margins of the sheets to maintain support therefor and the locating and guiding means 11 will exert pressure against the edges to aid in the bending. At the completion of the bending, the margins of the sheets will be deposited on the shaping surface of the end portions of the mold and the upper supporting edge of bars 20 will move into abutting relation with said portions slightly below said shaping surface, as best shown in Fig. 3. As in the aforementioned patent, the opposite ends of a synchronization means 22 may be connected by yokes 23 to the movable arms 19 of the supporting means 17 at each end of the mold for insuring that the opposite end portions of the sheets settle onto the mold at substantially the same time.

Dealing now specifically with the preferred construction of the novel locating and guiding means 11 of this invention, a pair of substantially U shaped brackets 24 are secured to the outer side of each of the bars 20 slightly below the upper edge thereof to receive a pair of locator blocks 25 which rest upon the lower walls of the brackets and are retained therein by a screw 26 threaded through the back wall thereof.

Figure 4:
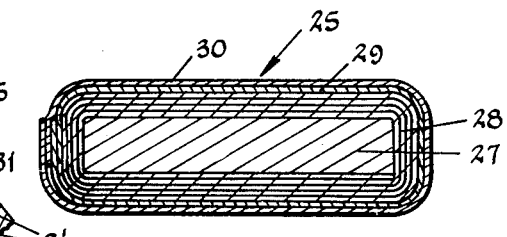
Fig. 4 is an enlarged sectional view of the locating and guiding means removed from its support, taken substantially along line 4—4 of Fig. 3.

In accordance with this invention and as previously mentioned, the locator block 25 includes a vertically disposed core 27 (Fig. 4) of any suitable hard material which will withstand the bending temperatures of glass such as, for example, "Transite." Disposed around the core 27 and forming a resilient layer 28 of insulating material thereover are one or more wrappings or laminations of glass cloth. One or more wrappings of stainless steel mesh, such as 200-mesh, may be and preferably are disposed around the resilient layer 28 to form a heat-conducting layer 29 for contact with the edge of the glass sheet. An outer layer 30 of sheet metal is then wrapped around the layer 29 and the end thereof suitably secured to provide the block 25 with the necessary compactness as well as a smooth surface over which the glass sheet edges may slide without breakage or chipping.

Thus, a locator block constructed in the manner above described has been found to provide a sufficiently smooth resilient surface against which the glass sheet edges may bear during the bending operation without chipping thereof and/or distortion of said sheet. At the same time, the novel locator block of this invention is rigid enough to positively and securely maintain said edges in their properly guided position. As well, said locator block promotes improved heat transmission to the glass sheet edges bearing thereagainst thereby permitting said sheet to be bent in an improved manner.

As best shown in Fig. 3, the locator block 25 projects upwardly from the bracket 24 to provide an inner surface against which either the single glass sheet G or matched sheets G' are adapted to bear. It has been found good practice in bending matched sheets to provide the edge corners of said sheets with a slight bevel 31 as a further precaution against chipping.

While for purposes of illustration, two locating and guiding means 11 have been shown at each end of the mold, it may be found that one is sufficient or, on the other hand, depending on the size and shape of the glass sheets being bent, three or more may be needed.

It is to be further understood that the form of the invention disclosed herein is to be taken as the preferred embodiment thereof, and that various changes in the shape, size and arrangement of parts may be resorted to without departing from the spirit of the invention or the scope of the following claims.

I claim:

1. In combination with a bending mold having a shaping surface into conformity with which a glass sheet is adapted to be bent, a locator block associated with said mold for locating and guiding an edge of said sheet during the bending thereof, said block comprising a hard, heat resistant core, a resilient layer about said core and a sheet edge contacting layer of heat-conducting material.

2. In combination with a bending mold having a shaping surface into conformity with which a glass sheet is adapted to be bent, pivotally mounted locator blocks arranged at opposite ends of said mold for locating and guiding the opposite end edges of said sheet during the bending thereof, each of said blocks comprising a hard, heat resistant core, a resilient layer about said core, and a sheet edge contacting layer of heat-conducting material.

3. In combination with a bending mold having a shaping surface into conformity with which a glass sheet is adapted to be bent, a movably mounted locator block as defined in claim 1, wherein the resilient layer of said locator block is composed of glass cloth.

4. In combination with a bending mold having a shaping surface into conformity with which a glass sheet is adapted to be bent, a movably mounted locator block as defined in claim 1, wherein the heat-conducting layer includes a layer of stainless steel mesh.

5. In combination with a bending mold having a shaping surface into conformity with which a glass sheet is adapted to be bent, a movably mounted locator block as defined in claim 1, wherein the heat-conducting layer includes an outer lamination of sheet metal having a smooth edge contacting surface.

6. In combination with a bending mold having a shaping surface into conformity with which a glass sheet is adapted to be bent, a movably mounted locator block as defined in claim 1, wherein the heat-conducting layer is composed of an inner layer of stainless steel mesh and an outer layer of sheet metal.

7. In combination with a bending mold having a shaping surface into conformity with which a glass sheet is adapted to be bent, a movably mounted locator block as defined in claim 1, wherein the resilient layer is composed of glass cloth and the heat-conducting layer is composed of an inner lamination of stainless steel mesh with an outer layer of sheet metal thereabout.

References Cited in the file of this patent

UNITED STATES PATENTS 2,608,030    Jendrisak --------------- Aug. 26, 1952